United States Patent

[11] 3,542,059

| [72] | Inventors | Jay L. Blanchard<br>2226 Maryanne Drive, Charlotte, North Carolina 28209;<br>Beymon Blanchard, 508 Knollwood Ave., Ashtabula, Ohio 44004 |
|---|---|---|
| [21] | Appl. No. | 764,098 |
| [22] | Filed | Oct. 1, 1968 |
| [45] | Patented | Nov. 24, 1970 |

[54] DRAINAGE VALVE
7 Claims, 5 Drawing Figs.

[52] U.S. Cl. ............................................. 137/388,
27/35; 52/131; 137/433, 137/533.17, 137/550
[51] Int. Cl. .................................................. F16k 45/00,
E04h 13/00
[50] Field of Search......................................... 137/202,
388, 429, 430, 433, 517, 519, 528, 533, 533.17,
533.19, 550; 210/119; 52/129, 131

[56] References Cited
UNITED STATES PATENTS

| 911,027 | 2/1909 | Bratton | 52/131 |
| 1,032,704 | 7/1912 | Risberg | 137/433X |
| 1,628,441 | 5/1927 | Soresi | 137/519X |
| 1,851,084 | 3/1932 | Brown et al. | 137/388X |
| 2,554,053 | 5/1951 | Hyer | 137/433X |
| 2,783,523 | 3/1957 | Halley | 52/131X |

Primary Examiner—M. Cary Nelson
Assistant Examiner—Richard Gerard
Attorney—Parrott, Bell, Seltzer, Park and Gibson ABSTRACT: A drainage valve adapted for many uses including burial vaults to allow the drainage of fluids therefrom and to prevent the passage of liquids thereinto when a liquid level rises above the drainage valve. The drainage valve comprises a vertically extending valve body having an interior passageway extending therethrough and an inverted cup-shaped valve member freely disposed within the passageway for free vertical and horizontal movement therein and having a generally conical-shaped upper sealing surface, whereby liquid flowing into the valve body will cause the valve member to move vertically upwardly against the force of gravity due to the buoyancy created by the formation of an air pocket therein to allow the valve member to seat itself in a self-centering manner within an upper port of the valve body to close the drainage valve and prevent liquid from flowing through the valve.

Patented Nov. 24, 1970

3,542,059

INVENTORS:
JAY L. BLANCHARD
and BEYMON BLANCHARD

By Parrott, Bell, Seltzer, Park & Gibson
ATTORNEYS

DRAINAGE VALVE

This invention relates to a drainage valve adapted for use in the floor portion of a burial vault or other container and specifically designed to allow the drainage of fluids from the burial vault or other container and to prevent the passage of liquids through the drainage valve into the burial vault or other container due to a liquid level rising above the bottom of the drainage valve.

In various containers, particularly burial vaults or the like, it is desirable to allow the drainage of fluids, gases or liquids, from the container, but to prevent the flow of liquids thereinto due to liquids rising above the lower portion of the drainage valve.

This is particularly true in burial vaults which comprise enclosed interior chambers for containing a casket having a decomposing corpse therein wherein the decomposing corpse produces fluids, liquids and gases, which desirably should be drained from the burial vault. These burial vaults are normally placed underground and a problem of water entering the burial vaults through the drainage valves is created when the water table in the ground rises above the drainage valve in the burial vault.

Accordingly, it is the object of this invention to provide an improved drainage valve which will overcome the above problems in a burial vault or other container wherein it is desired to drain liquids from the burial vault or other container, but to prevent the passage of liquids into the burial vault or other container when the liquid level rises above that of the drainage valve.

By this invention, the above object has been accomplished by providing a drainage valve for use with a burial vault or other container comprising a vertically extending valve body adapted to be secured in the container and having an interior wall defining a vertically extending passageway therethrough, a generally circular upper port and a lower port. The upper port is of smaller dimensions than the passageway and opens into the container. The passageway and upper and lower ports provide communication between the interior of the container and the outside thereof for the drainage of fluids therefrom. The drainage valve further comprises an inverted cup-shaped valve member freely disposed within the passageway of the valve body and being of smaller dimensions than the passageway for free vertical and horizontal movement therein and for normally maintaining the passageway open by assuming a lower position in the passageway under the influence of gravity for the drainage and free flow of fluids therethrough. The valve member has a generally conical-shaped upper sealing surface of greater dimensions than the upper port in the valve body.

By this construction, liquids flowing into the valve body through the lower port thereof as a result of a liquid level rising above the lower portion of the valve will cause the valve member to move vertically upwardly against the force of gravity due to the buoyancy created by the formation of an air pocket within the cup-shaped valve member to allow the upper conical surface of the valve member to seat itself in a self-centering manner within the upper port of the valve body to close the passageway and prevent liquids from flowing through the valve into the chamber.

Some of the objects and advantages of this invention having been stated, other objects and advantages will appear as the description proceeds, when taken in conjunction with the accompanying drawings, in which.

Figure 1:
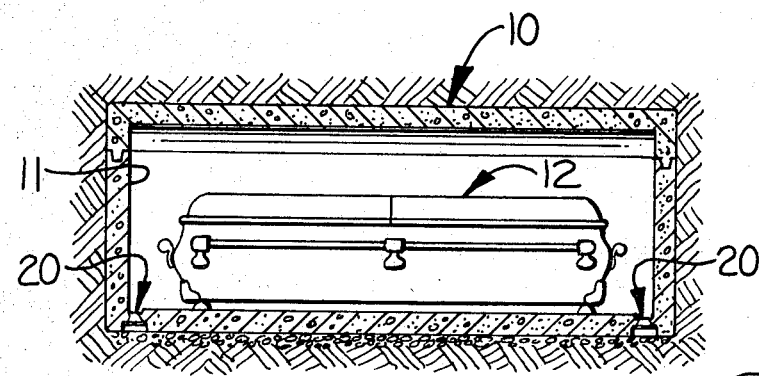
FIG. 1 is a side sectional elevational view of a burial vault containing a casket therein and utilizing the improved drainage valve of this invention.

Referring now to the drawings, in FIG. 1 there is illustrated a burial vault, generally indicated by the reference numeral 10, comprising an enclosed interior chamber 11 for containing a casket 12 having a decomposing corpse therein. The burial vault 10 is adapted to be placed underground, as illustrated in FIG. 1.

The burial vault 10 further comprises the improved drainage valve of this invention, indicated generally by the reference numeral 20. These drainage valves are secured in the floor portion of the vault 10 for communication with the interior chamber 11.

While the improved drainage valve 20 of this invention will be specifically described and is specifically illustrated in the drawings in combination with a burial vault, it is to be understood that the drainage valve is applicable for many other uses.

The drainage valve 20 comprises a vertically extending valve body 21 secured in the floor portion of the vault 10 and having an interior wall 22 defining a vertically extending passageway 23 therethrough, a generally circular upper port 24 of smaller dimensions than the passageway 23 and opening into the interior chamber 11 of the burial vault 10, and a lower port 25. The passageway 23 and the upper and lower ports 24 and 25 provide communication between the interior chamber 11 of the vault 10 and the outside of the vault 10 for the drainage of fluids from the interior chamber 11 produced by the decomposing corpse in the casket 12 which is normally unsealed.

Figure 2:
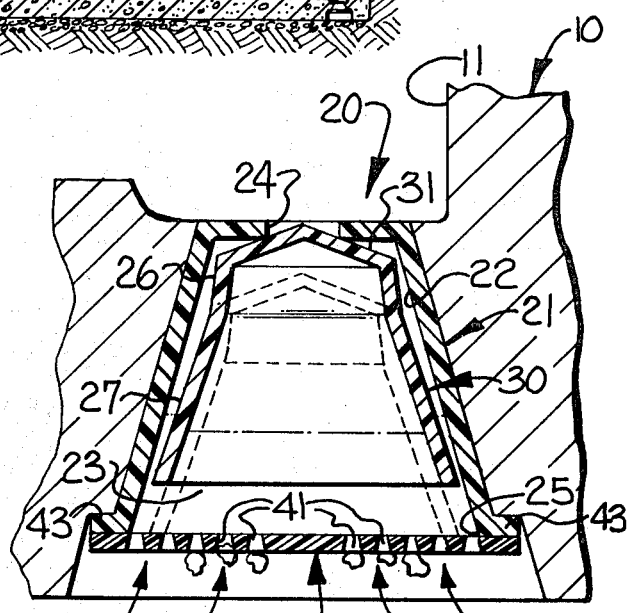
FIG. 2 is an enlarged cross-sectional view of the improved drainage valve of this invention.
Figure 4:
FIG. 4 is an enlarged cross-sectional detail showing the arrangement of the perforations in the filter plate of the drainage valve of this invention.
Figure 3:
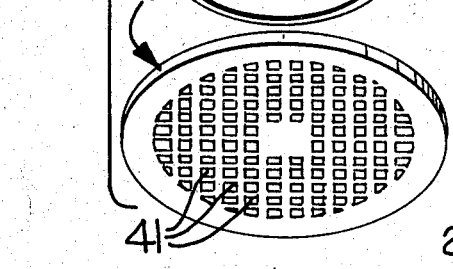
FIG. 3 is an exploded perspective view of the drainage valve of this invention.
Figure 5:
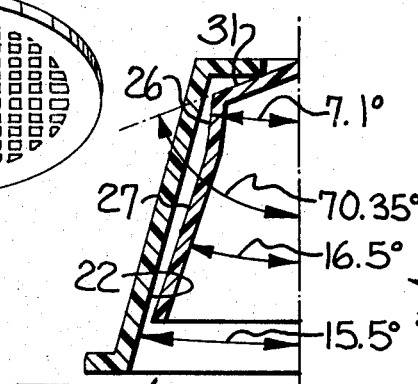
FIG. 5 is a partial cross-sectional view of a portion of the drainage valve of this invention illustrating the angles formed by various surfaces with respect to a central vertical axis.

The drainage valve 20 further comprises an inverted cup-shaped valve member 30 open at the bottom and freely disposed within the passageway 23 of the valve body 21 and being of smaller dimensions than the passageway 23 for free vertical and horizontal movement therein and for normally maintaining the passageway open by assuming a lower position, as shown in dotted lines in FIG. 2, in the passageway under the influence of gravity for the drainage and free flow of fluids therethrough. The valve member 30 has a generally conical-shaped upper sealing surface 31 of greater dimensions than the upper port 24 in the valve body 21.

By the above arrangement, liquid flowing into the valve body through the lower port 25 as a result of a rising liquid or water table in the ground will cause the valve member 30 to move vertically upwardly against the force of gravity due to the buoyancy created by the formation of an air pocket within the cup-shaped valve member 30 to allow the upper conical surface 31 of the valve member 30 to seat itself in line contact in a self-centering manner within the upper port 24 of the valve body to close the upper port and prevent liquids from flowing through the valve into the interior chamber 11 of the vault 10, as shown in solid lines in FIG. 2. The self-centering of the valve member 30 with respect to the upper port 24 of the valve body 21 is accomplished by the conical sealing surface 31 which causes the valve member 30 to center itself within the port 24 due to the above-described buoyancy.

The valve body 21 is preferably constructed of a rigid corrosion-resistant material, such as polypropylene, to provide resistance to attack from environmental conditions, structural strength, resistance to impact, and good appearance. The valve member 30 is preferably constructed of a flexible corrosion-resistant material, such as polyvinyl chloride, which provides resistance to environmental conditions, long life and resiliency to effect a positive sealing by the upper conical surface 31 within the port 24. A commercially acceptable hardness of Durometer value of between 65—75 for the polyvinyl chloride material of the valve member has been found to produce adequate flexibility for providing the above sealing effect.

Preferably, the interior wall 22 of the valve body 21 is frustoconical shaped and the outside surface of the valve member 30 extending from the upper sealing surface 31 is of a similar overall frustoconical shape. More particularly, the aforesaid outside surface of the valve member 30 includes upper and lower portions 26 and 27 in which the upper portion 26 forms a smaller angle, preferably about 7.1°, with respect to a central vertical axis than the angle, preferably about 15.5°, formed by the interior wall 22 of the valve body with a central vertical axis. The lower portion preferably forms a greater angle, desirably about 16.5°, with respect to a central vertical axis than the angle, preferably about 15.5°, formed by the interior wall 22 of the valve body with a central vertical axis.

By the above angular arrangement, excessive frictional engagement between the outside surface of the valve member 30 and the interior wall of the valve body 21 is minimized and contact is only obtained at a lower line and an upper line, as may be seen in FIG. 2. Also, a greater flow area is provided between the valve member and the valve body. The generally frustoconical shape of the interior wall 22 of the valve body 21 and of the outside surface of the valve member 30 along with the above angular relationship allows the valve member 30 to be guided accurately in a self-centering manner into sealing position and yet minimizes opportunity for sticking or otherwise malfunctioning.

It has also been found desirable for the upper conical-shaped sealing surface 31 of the valve member 30 to form an angle of approximately 70.35° with a central vertical axis so as to provide adequate relief to avoid wedging of the valve member 30 into the port 24 and to provide a sealing surface 31 which will mate with the lower edge of the port to minimize the effect of surface irregularities on the port.

The drainage valve 20 further comprises a filter plate 40 secured to the valve body, in the manner shown in FIG. 2, and extending across the lower port 25 therein and defining a plurality of perforations 41 therein for allowing the flow of fluids therethrough. The perforations 41 in the filter plate 40 are preferably tapered from the outside to the inside or have greater exterior openings than interior openings to restrict the size of particles of matter, such as dirt, etc., entering the valve through the filter plate and to allow these particles of matter to be flushed out of the filter plate in the free-flow direction and prevent clogging of the filter plate. The filter plate 40 is preferably constructed of the same material as the valve body 21, discussed above.

The filter plate 40 is preferably secured to the valve body 21 at a flange area 43 which provides good structural reinforcement and helps to maintain concentricity of the valve.

Thus, it may be seen that a compact drainage valve construction has been produced which will provide the above desired functions and will overcome problems heretofore experienced in burial vaults or other containers.

In the drawings and specification, there has been set forth a preferred embodiment of the invention and, although specific terms are employed, they are used in a generic and descriptive sense only and not for purposes of limitation, the scope of the invention being defined in the appended claims.

We claim:

1. A drainage valve adapted for use with a container and specifically constructed to allow the drainage of fluids from the container through said valve and to prevent the passage of liquids through said valve into the container, said valve comprising:

a. a vertically extending valve body constructed of a rigid corrosion-resistant material and adapted to be secured in the container and having an interior wall defining a vertically extending frustoconical-shaped passageway therethrough, a generally circular upper port and a lower port, said upper port being of smaller dimensions than said passageway and opening into the container, said passageway and said upper and lower ports providing communication between the interior of the container and the outside thereof for the drainage of fluids therefrom;

b. an inverted cup-shaped valve member having an open bottom and an outside surface of a similar overall frustoconical shape as said passageway and constructed of a flexible corrosion-resistant material and freely disposed within said passageway of said valve body and being of smaller dimensions than said passageway for free vertical and horizontal movement therein and for normally maintaining said passageway open by assuming a lower position in said passageway under the influence of gravity for the drainage and free flow of fluids therethrough, said valve member having a generally conical-shaped upper sealing surface of greater dimensions than said upper port in said valve body and engaging said upper port in line contact when in closed position; whereby liquids flowing into said valve body through said lower port thereof as a result of a liquid level rising above the lower portion of said valve will cause said valve member to move vertically upwardly in a self-centering manner against the force of gravity due to the buoyancy created by the formation of an air pocket within said cup-shaped valve member to allow said upper conical surface of said valve member to seat itself in a self-centering manner in line contact within said upper port of said valve body to close said upper port and to prevent liquids from flowing into the chamber; and c. a filter plate secured to said valve body and extending across said lower port therein and defining a plurality of perforations therein for allowing the flow of fluids therethrough.

2. A drainage valve, as set forth in claim 1, in which said outside surface of said valve member includes upper and lower portions, and in which said upper portion forms a smaller angle with respect to a central vertical axis than said interior wall of said valve body defining said passageway and said lower portion forms a greater angle with respect to a central vertical axis than said interior wall of said valve body defining said passageway; whereby frictional engagement between said outside surface of said valve member and said interior wall of said valve body defining said passageway is minimized to allow smooth relative movement and greater fluid flow area between said valve member and said valve body.

3. A drainage valve, as set forth in claim 2, in which said upper sealing surface of said valve member forms a much greater angle with respect to a central vertical axis than said interior wall of said valve body defining said passageway and said upper and lower portions of said outside surface of said valve body to enhance the sealing engagement with said upper port of said valve body and to prevent wedging engagement therewith.

4. A drainage valve, as set forth in claim 1, in which each of said perforations in said filter plate has a greater exterior opening than interior opening to restrict the size of particles of matter entering said valve through said filter plate and to allow particles of matter to be readily flushed out of said filter plate in the free-flow direction and prevent clogging of said filter plate.

5. A drainage valve adapted for use with a container and specifically constructed to allow the drainage of fluids from the container through said valve and to prevent the passage of liquids through said valve into the container, said valve comprising:

a. a vertically extending valve body formed of a rigid material and adapted to be secured in the container and having a generally frustoconical shaped interior wall defining a vertically extending passageway therethrough, a generally circular upper port and a lower port, said upper port being of smaller dimensions than said passageway and opening into the container, said passageway and said upper and lower ports providing communication between the interior of the container and the outside thereof for the drainage of fluids therefrom;

b. an inverted cup-shaped valve member having an open bottom and being freely disposed within said passageway of said valve body and being of smaller dimensions than said passageway for free vertical and horizontal movement therein and for normally maintaining said passageway open by assuming a lower position in said passageway under the influence of gravity for the drainage and free flow of fluids therethrough, said valve member being constructed of a flexible material and having a generally conical-shaped upper sealing surface of greater dimensions than said upper port in said valve body, and an outside surface extending from said sealing surface of a similar overall frustoconical shape as said passageway, whereby liquids flowing into said valve body through said lower port thereof as a result of a liquid level rising above the lower portion of said valve will cause said valve member to move vertically upwardly against the force of gravity due to the buoyancy created by the formation of an air pocket within said cup-shaped valve member to allow said upper conical surface of said valve member to seat itself in a self-centering manner within said upper port of said valve body to close said upper port and prevent liquids from flowing through said valve into the chamber; and c. wherein said outside surface of said valve member includes upper and lower portions, and in which said upper portion forms a smaller angle with respect to a central vertical axis than said interior wall of said valve body defining said passageway, and said lower portion forms a greater angle with respect to a central vertical axis than said interior wall of said valve body defining said passageway, whereby frictional engagement between said outside surface of said valve member and said interior wall of said valve body defining said passageway is minimized to allow smooth relative movement and greater fluid flow area between said valve member and said valve body.

6. A drainage valve, as set forth in claim 5, in which said upper sealing surface of said valve member forms a much greater angle with respect to a central vertical axis than said interior wall of said valve body defining said passageway and said upper and lower portions of said outside surface of said valve body to enhance the sealing engagement with said upper port of said valve body and to prevent wedging engagement therewith.

7. A drainage valve adapted for use with a container and specifically constructed to allow the drainage of fluids from the container through said valve and to prevent the passage of liquids through said valve into the container, said valve comprising:

a. a vertically extending valve body adapted to be secured in the container and having an interior wall defining a vertically extending passageway therethrough, a generally circular upper port and a lower port, said upper port being of smaller dimensions than said passageway and opening into the container, said passageway and said upper and lower ports providing communication between the interior of the container and the outside thereof for the drainage of fluids therefrom;

b. an inverted cup-shaped valve member having an open bottom and being freely disposed within said passageway of said valve body and being of smaller dimensions than said passageway for free vertical and horizontal movement therein and for normally maintaining said passageway open by assuming a lower position in said passageway under the influence of gravity for the drainage and free flow of fluids therethrough, said valve member having a generally conical-shaped upper sealing surface of greater dimensions than said upper port in said valve body, whereby liquids flowing into said valve body through said lower port thereof as a result of a liquid level rising above the lower portion of said valve will cause said valve member to move vertically upwardly against the force of gravity due to the buoyancy created by the formation of an air pocket within said cup-shaped valve member to allow said upper conical surface of said valve member to seat itself in a self-centering manner within said upper port of said valve body to close said upper port and prevent liquids from flowing through said valve into the chamber; and c. a filter plate secured to said valve body and extending across said lower port therein and defining a plurality of perforations therein for allowing the flow of fluids therethrough and wherein each of said perforations in said filter plate has a greater exterior opening than interior opening to restrict the size of particles of matter entering said valve through said filter plate and to allow particles of matter to be readily flushed out of said filter plate in the free-flow direction and prevent clogging of said filter plate.